United States Patent [19]

Thalmann et al.

[11] Patent Number: 4,515,177
[45] Date of Patent: May 7, 1985

[54] MOLDED CONNECTION PIECE

[75] Inventors: Alfred Thalmann; Fritz Reich, both of Uhwiesen, Switzerland

[73] Assignee: George Fischer Limited, Schaffhausen, Switzerland

[21] Appl. No.: 488,650

[22] Filed: Apr. 26, 1983

[30] Foreign Application Priority Data

Apr. 29, 1982 [CH] Switzerland .......................... 2638/82

[51] Int. Cl.³ ............................................. F16K 43/00
[52] U.S. Cl. ..................... 137/318; 156/274.2; 219/535; 219/544; 285/21
[58] Field of Search ...................... 137/318; 156/274.2, 156/379.7; 219/535, 544; 285/21

[56] References Cited

U.S. PATENT DOCUMENTS

| 1,570,887 | 1/1926 | Graves | 285/373 |
|---|---|---|---|
| 2,309,253 | 1/1943 | Newell | 285/108 |
| 3,240,226 | 3/1966 | Burkholder | 137/318 |
| 3,422,179 | 1/1969 | Bauer et al. | 285/21 |
| 3,692,044 | 9/1972 | Wise | 137/318 |
| 3,833,020 | 9/1974 | Smith | 137/318 |
| 3,867,964 | 2/1975 | Gardner | 137/318 |
| 3,918,748 | 11/1975 | Acda | 285/21 |
| 3,987,276 | 10/1976 | Vogelsanger et al. | 219/535 |
| 4,034,777 | 7/1977 | Gebelius | 137/318 |
| 4,174,926 | 4/1979 | Stähli | 219/535 |
| 4,258,742 | 3/1981 | Louthan et al. | 137/318 |
| 4,313,053 | 1/1982 | Sturm | 285/21 |
| 4,355,656 | 10/1982 | Smith | 137/318 |
| 4,365,144 | 12/1982 | Reich et al. | 219/535 |
| 4,375,591 | 3/1983 | Sturm | 219/544 |

FOREIGN PATENT DOCUMENTS

| 1716598 | 10/1955 | Fed. Rep. of Germany . | |
| 5218 | 1/1979 | Japan | 285/21 |
| 1197318 | 7/1970 | United Kingdom . | |
| 1320720 | 6/1973 | United Kingdom . | |

Primary Examiner—George L. Walton
Attorney, Agent, or Firm—Roylance, Abrams, Berdo & Goodman

[57] ABSTRACT

A molded connecting piece has two saddle-shaped pieces one of which carries a hole drilling or punching tool and the other of which is connected to a branch line. The two connecting pieces are interconnected by an annular channel so that, when they surround are attached to a pipeline and a hole is made in the line, the medium reaches the branch line from the pipeline through the hole, through the annular channel and to the branch line. Between the saddle pieces and the pipeline are heating mats by which a tight welding connection can be produced.

17 Claims, 4 Drawing Figures

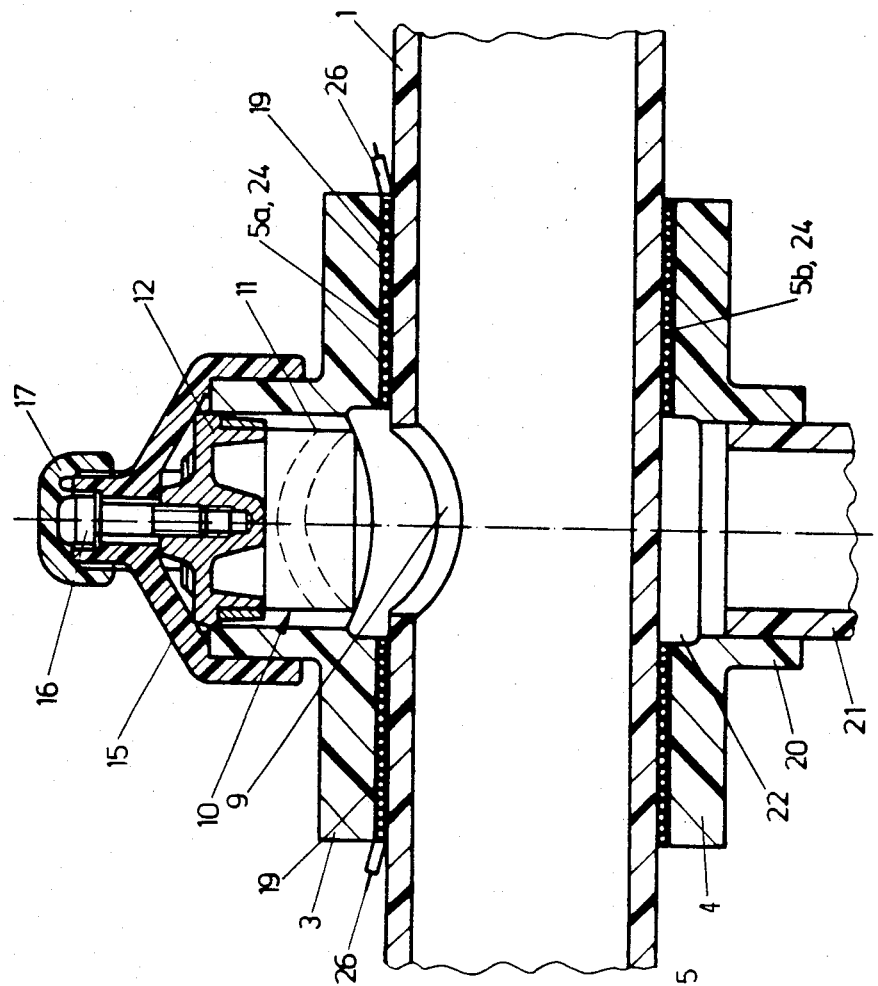

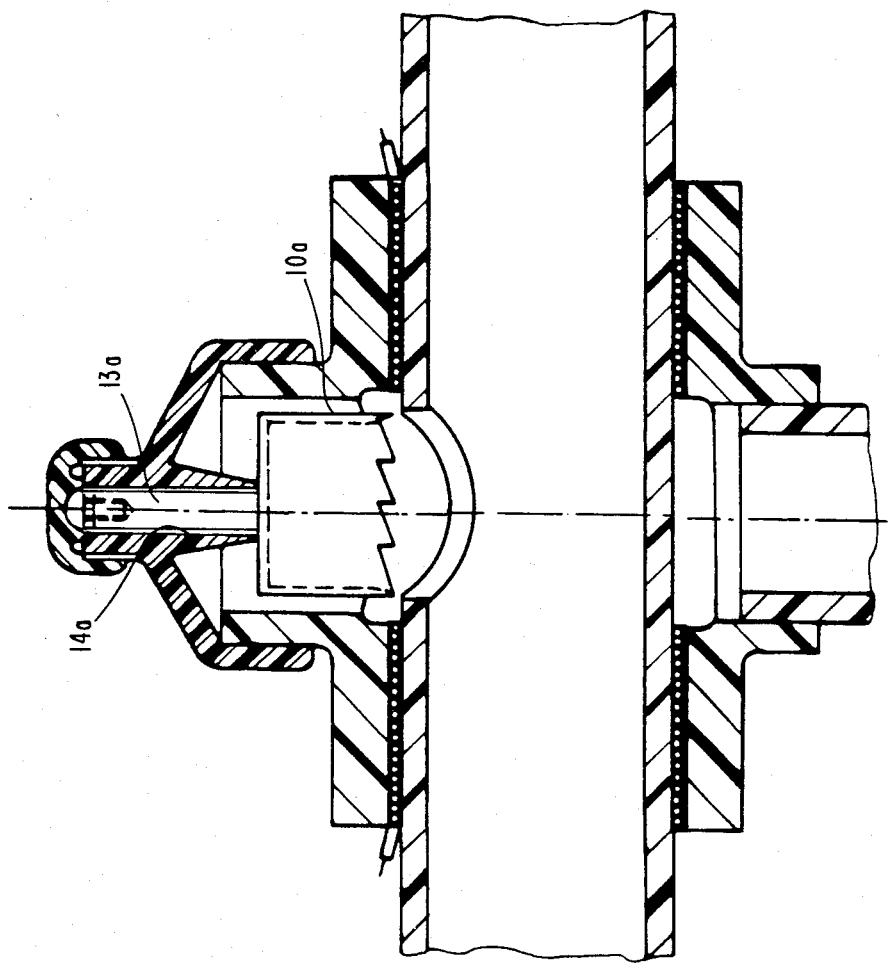

MOLDED CONNECTION PIECE

BACKGROUND OF THE INVENTION

For the purpose of forming a connection to a main pipeline so that a branch pipeline of smaller diameter is joined thereto, it has been known to put onto the main pipeline molded pieces, called molded centering pieces, and to produce the connection with the branch line connected to the molded piece by spot drilling of the main line. Such centering molded pieces are, in most instances, formed in two parts which are somewhat saddle-shaped, the two saddle halves being held together, for example, by wedges as shown in Swiss Pat. No. 464,260, or the two halves are held together, in the case of plastic lines, by a welded connection with the main pipeline as shown in Swiss Pat. No. 528,697.

In all known molded centering pieces, the connecting sleeve for the branch line is provided at the centering sleeve for the hole-forming tool, extending radially to the main pipeline with the connecting piece. Such an arrangement only permits the connection of branch lines which have a cross-section or diameter considerably smaller than that of the main pipeline if the connection structure is to be a compact arrangement.

Branch lines with a diameter at least as large, or only slightly smaller, than the main pipeline may, to be sure, be produced with commercially available molded T-shaped pieces, but this is expensive and it is not possible to use this kind of structure when the branch connection is to be made while maintaining the operating pressure of the medium being conducted through the main pipeline.

BRIEF DESCRIPTION OF THE INVENTION

An object of the present invention is to provide a molded connection structure by which a branch line can be connected with a main pipeline, even during the through-flow of the medium being carried by the main pipeline under operating pressure, and wherein the diameter of the branch line can be smaller than or as large as that of the main pipeline.

A further object is to provide such a structure in which the molded piece is simple to shape, employing plastic shaping techniques, and should be absolutely tightly connectable with the main pipeline.

Briefly described, the invention includes a molded connection device for use in forming a branch connection of a conduit with a pipeline comprising the combination of first and second connection members each having a surface shaped to mate with and partially surround the pipeline; means carried by said first connection member for penetrating said pipeline and forming a hole therein; means carried by said second connection member for connection to a conduit; and means in said first and second members defining an annularly extending channel to permit flow of fluid from the interior of said pipeline, through said opening and said annularly extending channel and to said conduit.

As a result of the arrangement of the connecting sleeve for the branch line, in accordance with the invention, on the side of the pipe periphery which is opposite the tool and the interconnection of the two sleeves with an annular channel, it is possible, even when the main pipeline is in the category of large diameter, to connect branch lines which have equal or approximately equal diameters to the pipeline itself.

The tool needed for the production of the correspondingly large hole requires only a short movement path as a result of which the connecting piece for the tool can be made quite short, despite its large diameter. As a result, the structure in accordance with the invention has the advantages of being simple, of saving material, and of having a structural shape with a low height, all of these combining to provide a component which is especially suitable for production of the molded connection pieces made of plastic using, for example, injection molding processes.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a transverse section through a molded connection piece of a type which can be welded to the pipeline in accordance with the invention;

FIG. 2 is a longitudinal sectional view through the main pipeline along line II—II of FIG. 1;

FIG. 4 is a longitudinal sectional view through a pipeline and a molded connection in accordance with a further embodiment of the invention.

DETAILED DESCRIPTION OF PREFERRED EMBODIMENTS

Figure 3:
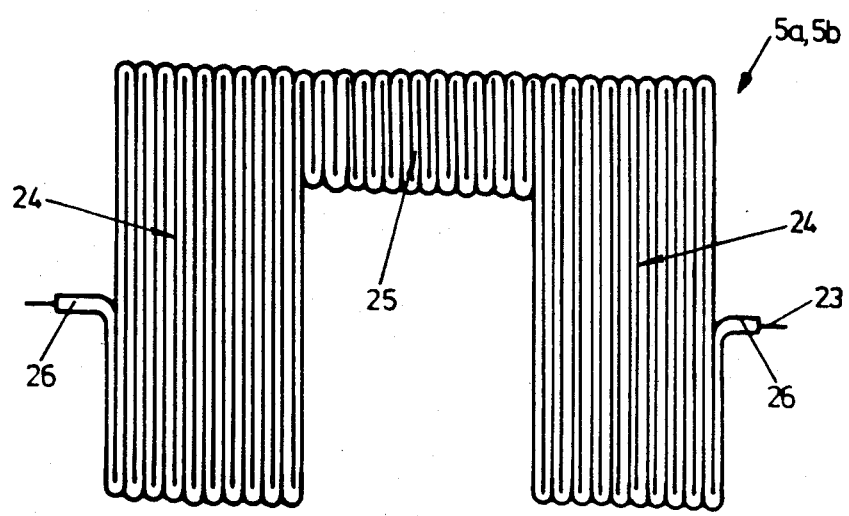
FIG. 3 is a plan view of a heating mat usable in the structures of FIGS. 1 and 2 and shown in its flat, spread-out state.

As shown in the drawings, a molded connection structure indicated generally at 2 is mounted on a pipeline 1 made of plastic, the molded device having two saddle-shaped pieces 3 and 4. The two saddle pieces 3 and 4 are welded to the pipeline 1 and also to each other by means of two, preferably identical, heating mats 5a and 5b, each of which is associated with one of the saddle pieces 3, 4.

Each of the saddle pieces 3, 4 is formed somewhat in the shape of half of a cup, or half of a cylinder, and each is provided at its lateral edges (those which extend generally parallel with the main pipe axis) with flanges 6a and 6b. When assembled as shown, the flange 6a on one of the saddle pieces is opposite the flange 6b on the other saddle piece, the two flanges and the edges adjacent thereto thus forming a gap 7 which extends longitudinally parallel with the pipeline 1, the gap being in a plane which is preferably nearly tangential with respect to the outer surface of pipeline 1.

The saddle piece 3, which is the upper one shown in the drawings, has a connection piece 8 in which a tool 10 is disposed for the purpose of producing a hole 9 in pipeline 1. In the embodiment shown, the tool is formed as a hole-punching tool 10 comprising a cutting part 11 and a guide part 12. In FIG. 1, the left half of the drawing shows the tool 10 in its lowest cutting position wherein a bar 13 is threaded into guide part 12, the bar being guided in a hole 14 which forms a passage through a cover part 15 connected firmly with the connection part 8. Hole 9 is produced by pressure or a blow delivered onto the outside end of bar 13 by means of a striking tool such as a hammer. In the right half of FIG. 1, the tool 10 is shown in its upper, retracted, rest position after having produced the hole 9. In that position, a screw 16 is threaded into the guide part 12, instead of bar 13, the screw acting to hold the tool 10 firmly in the part 15 of the cover, the through-hold 14 of the cover being tightly by a cover gap 17, also seen in FIG. 2.

The punched-out pipe portion 18 removed from pipeline 1 is lifted up by means of the tool 10 and remains in this position because of the pressure of the medium passing through the interior of pipe 1.

The hole-forming tool can also be formed as a milling or drilling tool wherein, as shown in FIG. 4, the bar 13a and the passage hole 14a require a feed thread for the production of the feed movement while turning the tool 10a. Alternatively, separate drilling apparatus can be attached to the connecting piece.

In either embodiment, the saddle piece 4 has a connecting sleeve 20 to which a branch line 21 can be fixedly attached by a non-soluble connection such as, for example, a welded or glued connection, or, alternatively, by means of a dissolvable connection.

The branching sleeve or tube 21 is thus disposed radially relative to the pipeline 1 from the half of the periphery of the pipe which is opposite to the connecting piece 8 which carries the tool 10, and, advantageously, both of the connecting pieces 8 and 20 are disposed in alignment with one another. On the inside diameter of the saddle pieces 3, 4 there are recesses arranged between two supporting surfaces 19, which are required for welding together, the recesses being semi-annular and, together, form an annular channel 22 which connects the two pieces 8 and 20.

FIG. 3 shows a heating mat 5a or 5b, the two mats being identical, which consists of a zigzag-shaped arrangement of a heating wire 23 which is sheathed and insulated by plastic, the mat being spread out in a flat form in the illustration of FIG. 3.

The heating wire 23 is wound such that the heating mat has an overall U-shaped with two legs 24 and a bridge 25. The two projecting ends 26 of the heating wire of each heating mat, in the completely mounted state, project from beneath the ends of the saddle pieces or are guided to a plug element. By means of clamping or plugging connections, the winding can be connected to a power source, these ends also being illustrated in FIG. 2.

Each heating mat 5a, 5b is thus inserted between the pipeline 1 and the saddle pieces 3, 4, respectively, in such a way that the two legs 24 are arranged to lie between the outside surface of pipeline 1 and the support surfaces 19 of the saddle pieces 3, 4 with the bridge portion 25 always lying in one of the gaps 7. The two legs thus enclose the pipeline 1 at the full periphery with the end of the leg 24 of the heating mat 5a or 5b forming a mutual cover with the bridge 25 of the other heating mat 5b or 5a disposed in the gap 7. Thus, considered together, the two mats form a figure-8 which is wrapped around pipe 1. This results in two complete peripheral welding connections between the pipeline and the saddle pieces in the area of the support surfaces and two continuous longitudinal welding connections between saddle pieces 3, 4 in gap 7 so that annular channel 22 is completely sealed from the outside.

After producing the welding connection of the two saddle pieces with the pipeline by means of running heating current through the heating mats, the branch line 21 is connected to the connecting sleeve 20 and, subsequently, the tool is operated to punch out or drill out hole 9, establishing the connection between the pipeline 1 and branch line 21 so that the medium carried by the main pipeline 1 reaches the branch line 21 through hole 9 and annular channel 22. The seal between guide part 12 and the connecting piece 8 makes it possible to produce the hole even when there is flowing medium under pressure within pipe 1. After production of the hole 9, the tool is secured by means of screw 16 and the hole constituting passage 14 is tightly closed with cover cap 17.

In addition to the welding connection described, it will be recognized that these saddle pieces can also be connected to the main pipeline by means of an adhesive connecton or a releasable mechanical connection such as, for example, by means of screws or wedges associated with the pipeline with suitable seals on both sides of the annular passage since, as will be recognized, an effective seal on both sides of the annular passage with respect to the pipeline must be guaranteed. The molded connecting piece can also be formed in one piece with a hinge extending axially along one side which would permit opening the structure to encompass the portion of the pipeline to which the connection will be made.

While certain advantageous embodiments have been chosen to illustrate the invention, it will be understood by those skilled in the art that various changes and modifications can be made therein without departing from the scope of the invention as defined in the appended claims.

What is claimed is:

1. A molded connection device for connecting a conduit with a pipeline, comprising:
   first and second connection members, each of said connection members having a surface shaped to mate with and partially surround the pipeline;
   cutting means, mounted in said first connection member, for penetrating said pipeline and forming a hole only in one wall of the pipeline; coupling means, attached to said second connection member for connection to a conduit; and
   an annularly extending channel in said connection members providing fluid communication between the hole and the conduit and permitting flow of fluid from the interior of the pipeline, through the hole and said annularly extending channel and out the conduit when the cutting means is withdrawn into said first connection member.

2. A device according to claim 1 wherein said first and second connection members comprise separate, relatively movable saddle-shaped pieces.

3. A device according to claim 2 wherein each of said connection members comprises means for welding said saddle-shaped pieces to the pipeline.

4. A device according to claim 3 wherein said saddle-shaped pieces, taken together, are dimensioned to extend almost entirely around the pipeline when placed thereon, terminal edges of said saddle-shaped pieces defining longitudinally extending gaps on opposite sides of the pipeline, said gaps lying in planes generally tangential to said pipeline, and wherein said means for welding includes first and second heating mats shaped to occupy said gaps and to fully encompass a periphery of the pipeline, said mats being heatable to weld said pieces to the pipeline.

5. A device according to claim 4 wherein each of said heating mats is generally U-shaped having two legs and a bridging portion, said bridging portion being dimensioned to be received in one of said gaps.

6. A device according to claim 5 wherein said cutting means for penetrating comprises a rotary cutting tool and means defining a feed thread in said first connection.

7. A device according to claim 5 wherein said cutting means comprises an impact or pressure operated cutting tool.

8. A device according to claim 4 wherein said cutting means comprises a rotary cutting tool and means defining a feed thread in said first connection member.

9. A device according to claim 4 wherein said cutting means comprises an impact or pressure operated cutting tool.

10. A device according to claim 3 wherein said cutting means comprises a rotary cutting tool and means defining a feed thread in said first connection member.

11. A device according to claim 3 wherein said cutting means comprises an impact or pressure operated cutting tool.

12. A device according to claim 2 wherein said cutting means comprises a rotary cutting tool and means defining a feed thread in said first connection member.

13. A device according to claim 2 wherein said cutting means comprises an impact or pressure operated cutting tool.

14. A device according to claim 1 wherein said cutting means comprises a rotary cutting tool and means defining a feed thread in said first connection member.

15. A device according to claim 1 wherein said cutting means comprises an impact or pressure operated cutting tool.

16. A device according to claim 2 wherein said cutting means and said coupling means are angularly separated.

17. A device according to claim 2 wherein said cutting means and said coupling means are substantially diametrically opposed.

* * * * *